United States Patent [19]
von der Heide

[11] Patent Number: 5,240,191
[45] Date of Patent: Aug. 31, 1993

[54] APPARATUS FOR TRANSPORTING AND DISCHARGING A FODDER BLOCK

[76] Inventor: Hans von der Heide, Ibbenbürener Strasse 17, D-4530 Ibbenbüren 2-Laggenbeck, Fed. Rep. of Germany

[21] Appl. No.: 823,412

[22] Filed: Jan. 21, 1992

[30] Foreign Application Priority Data

Feb. 1, 1991 [DE] Fed. Rep. of Germany ....... 4103042
Jun. 28, 1991 [DE] Fed. Rep. of Germany ....... 4121328

[51] Int. Cl.⁵ ............................................. A01F 25/70
[52] U.S. Cl. ................................. 241/101.7; 241/108
[58] Field of Search ................ 241/101.7, 108, 119, 241/107, 280, 297

[56] References Cited
FOREIGN PATENT DOCUMENTS

| | | |
|---|---|---|
| 0026143 | 4/1981 | European Pat. Off. . |
| 0318723 | 6/1989 | European Pat. Off. . |
| 341350 | 11/1989 | European Pat. Off. ......... 241/101.7 |
| 359482 | 3/1990 | European Pat. Off. ......... 241/101.7 |
| 3232284 | 4/1984 | Fed. Rep. of Germany ... 241/101.7 |
| 2191992 | 12/1987 | United Kingdom . |

Primary Examiner—Doulgas D. Watts

[57] ABSTRACT

Apparatus for transporting and discharging a fodder block, the apparatus including a container for holding the fodder block and a comminuting and discharging facility which is connected with the container In a starting position of the apparatus the comminuting and discharging facility serves for the transport of the fodder block and the container is disposed with an open side pointing upwards and the comminuting and discharging facility is disposed above this open side of the container. The container together with the comminuting and discharging facility are tiltable to an angle of approximately 180° about an essentially horizontal swivelling axis into a discharging position in which the open side of the container points downwards and in which the comminuting and discharging facility is below this open side and in which the fodder block in the container is supplied by the action of gravity to the comminuting and discharging facility from above.

24 Claims, 7 Drawing Sheets

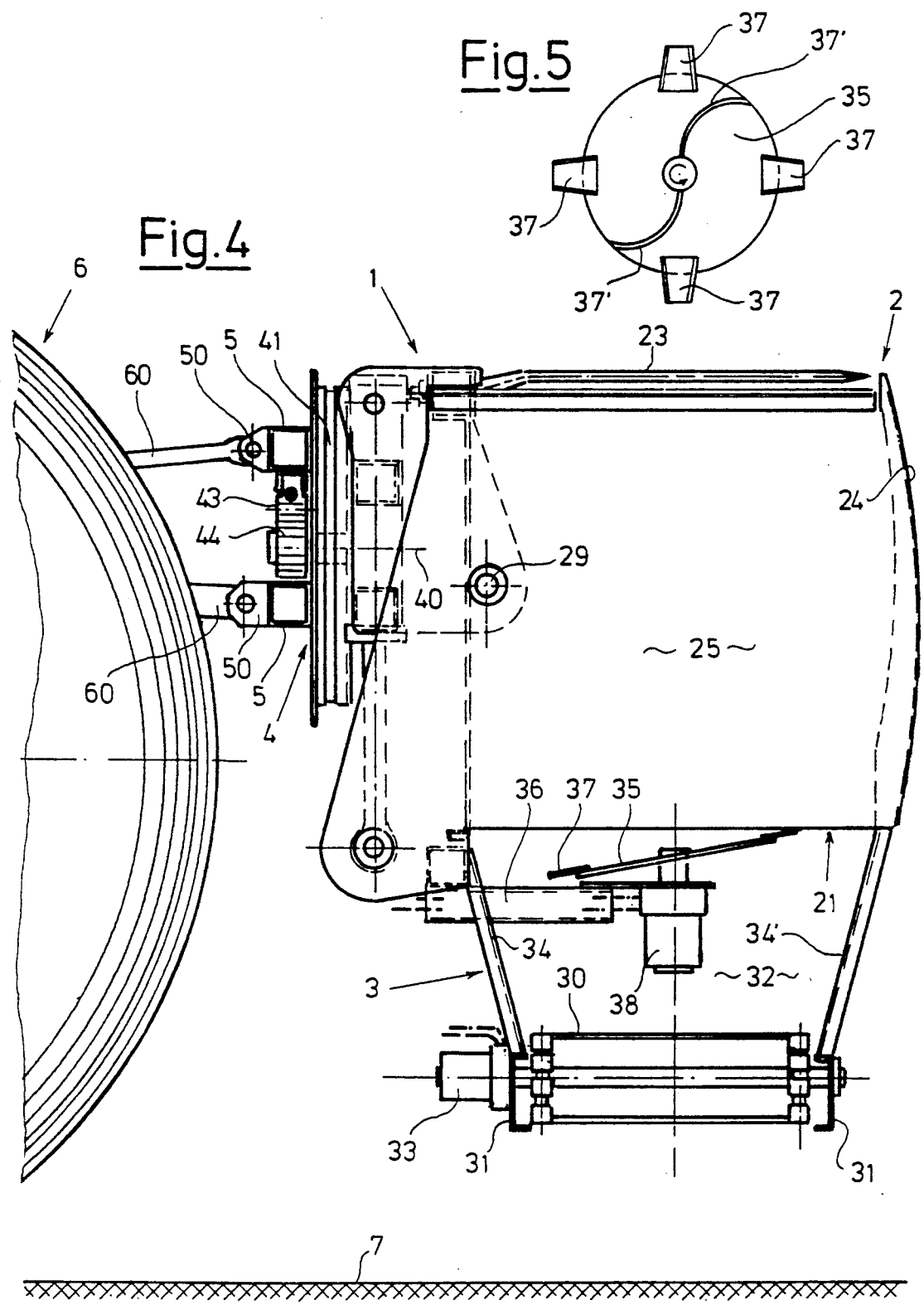

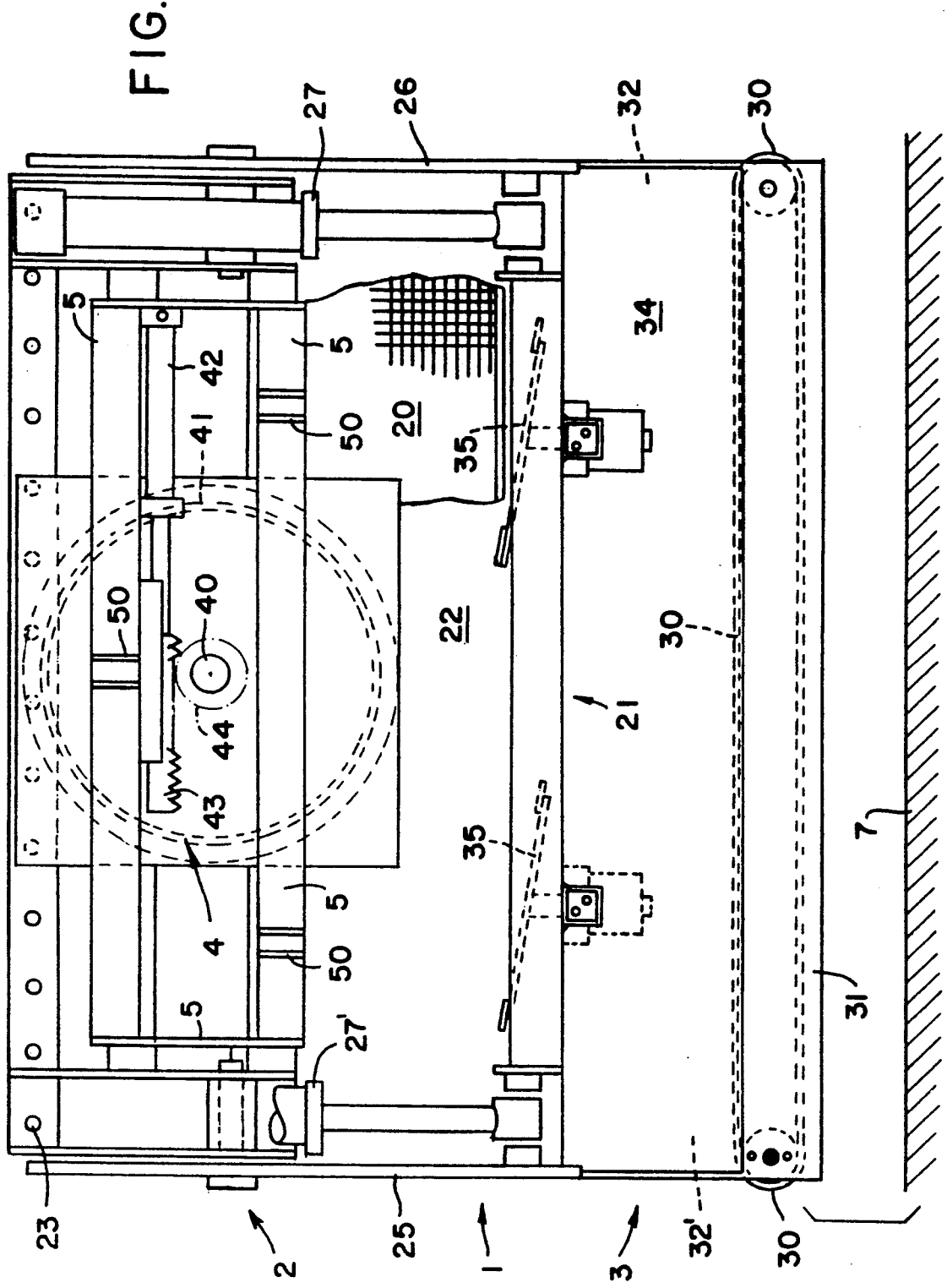

APPARATUS FOR TRANSPORTING AND DISCHARGING A FODDER BLOCK

FIELD OF INVENTION

The invention relates to an apparatus for transporting and discharging a fodder block.

BACKGROUND INFORMATION AND PRIOR ART

An apparatus of the aforementioned type is known from the European patent 0 318 723 A2. This apparatus consists of a container with a tiltable loading platform for loading a fodder block. The bottom of the container is constructed as a scraper floor. A chain-cutting arrangement for comminuting and bringing out the fodder is disposed on the side of the container and runs upwards and outwards at an angle. It is regarded as a disadvantage of this apparatus that the bottom of the container, because of its construction as a scraper floor, lies relatively high and that, because of the chain saw arrangement at the side, the overall width of the apparatus is relatively large. In addition, the large technical effort required to discharge the fodder on two sides is a disadvantage of this apparatus, since two separate chain-saw arrangements are required for this.

A further apparatus of the initially mentioned type is known from the European patent 0 026 143 A1. This apparatus also consists of a container with a tiltable loading platform and a scraper floor. A loosening and comminuting facility, consisting of a shaft and blades, is additionally disposed at the discharging end. Moreover, this apparatus furthermore has a cutting facility, which consists of a U-shaped guide rail, which runs in front of the container over the loading platform, and a cutting knife, which can travel along the guide rail and oscillates vertically. This cutting facility can also be tilted independently of the loading platform. The disadvantage of this apparatus is the large overall length, which is caused by the cutting facility, which protrudes far over the container. In addition, the bottom of the container is relatively high here also, because of its construction as a scraper floor.

Finally, an apparatus for cutting out and transporting a fodder block is known from the British patent 2,191,992 A. This apparatus also comprises a container. The front and side walls of this container form a tiltable unit and the lower edge is constructed with cutting edges. The bottom of the container here is a grate with prongs, which can be inserted into a supply of fodder, after which, by tilting the tiltable unit downwards, a block of fodder can be cut out. Overall, this apparatus admittedly is very compact and has a low-lying bottom. However, a selective comminuting and a metered discharge of the fodder is not possible, because the appropriate facilities are missing completely. It is merely possible to cast off the cut block that has been cut out, which results, however, only in an undefined loosening of the fodder.

OBJECT OF THE INVENTION

It is therefore an object of the invention to provide an apparatus of the initially named type, which, while having a very compact construction, makes it possible to take up and transport a fodder block easily and ensures a selective comminution and loosening as well as a metered discharge of the fodder.

SUMMARY OF THE INVENTION

Pursuant to the invention, this objective is accomplished by a transporting and discharging apparatus of the initially named type with the distinguishing characteristics of claim 1.

The tiltability about a horizontal axis, which is provided pursuant to the invention, achieves that the comminuting and discharging facility in the starting position of the apparatus lies in the upper part of the apparatus, that is, at a place, where it does not interfere with or impede the picking up of the fodder block. The bottom of the container can be very flat, because no parts of the comminuting or discharging facility are disposed in it and the bottom of the container can be lowered as far as the level of the foundation. Because the bottom is flat and can be lowered further, the picking up of a fodder block is greatly simplified, different types of pick-up, known as such from the state of the art, being possible. Only after the container together with the comminuting and discharging facility are tilted through 180°, does the latter reach a position below the open side of the container and can then bring about the comminution and discharge of the fodder. The described arrangement of the comminuting and discharging facility makes a compact construction of the apparatus possible. In particular, a narrow overall width and a short overall length are attained. By these means, the use of the apparatus even in confined spaces, such as those frequently encountered in older stable or cowshed buildings, is possible. A somewhat greater overall height is not critical, because the room height generally is much higher than the height required for the apparatus, including the comminuting and discharging facility.

In a significant further development of the invention, provisions are made that the container part has a cutting facility for cutting out a fodder block from a fodder supply. By these means, the usefulness of the apparatus becomes even more versatile and it becomes unnecessary to have a separate silo block cutter. The structural design of the cutting facility is practically immaterial and can be taken from the state of the art in the field of silo block cutters.

Further perfections and refinements of the apparatus are evident from the dependent claims.

The apparatus can be developed differently with respect to the comminuting and discharging facility. A first embodiment provides that the comminuting and discharging facility comprises a conveyor belt, which runs at a distance from the open side of the container part at right angles to the apparatus, and at least one cutting and scraping plate, which is disposed between the conveyor belt and the container part and can be made to rotate about an essentially vertical axis. In the discharging position of the apparatus, a fodder block in the apparatus lies on the cutting and scraping plate, so that, by the rotation of the latter, fodder can gradually be removed from the fodder block and brought to the conveyor belt, which, in the discharging position, lies below the cutting and scraping plate. Depending on the size of the apparatus, several cutting and scraping plates can also be provided next to one another in one plane.

The cutting and scraping plate is preferably constructed as a swash plate with cutting knives and/or scraper strips disposed radially on the outside and, in the discharging position of the apparatus, on the upper side. An effective loosening and comminution of the fodder is ensured by these means.

A second embodiment of the comminuting and discharging facility is characterized in that it comprises a conveyor belt, which runs at a distance from the open side of the container part at right angles to the apparatus, and of at least one scraper shaft, which is disposed between the conveyor belt and the container part and can be made to rotate about an essentially horizontal axis.

The scraper shaft or arrangement of several scraper shafts, provided for this construction of the apparatus as a comminuting facility offers the advantage that the free fall cross section for the fodder detached from the fodder block downwards to the conveyor belt is significantly larger and that therefore the danger that the fodder will obstruct or hang-up in the comminuting facility is very slight, even when long-fibered fodder, such as grass silage, is processed.

In accordance with one embodiment of this apparatus, the scraper shaft comprises a cylindrical or hollow cylindrical shaft and radially projecting scraper prongs, which are rigidly connected with the shaft. This design is simple and robust and provides high operational safety.

The scraper prongs are preferably constructed as flat, pointed, elliptical pieces of sheet metal and are disposed symmetrically with respect to the scraper shaft and in planes perpendicular to the axis of rotation of the scraper shaft. Such scraper prongs, on the one hand, are easily manufactured and, on the other, offer the advantage that they are equally effective for both directions of rotation of the scraper shaft. Moreover, their special shape ensures that the fodder fibers are carried along practically only as far as the fodder block lies against the scraper shaft. An undesirable further entrainment is prevented by the pointed, elliptical shape of the prongs, since this shape does not offer any hold for the fibers and the fibers slide off the curved edges of the prongs.

In addition, the scraper shaft can have, at least on the side facing the container part, a cover with slots that permit the passage of the scraper prongs. This cover acts as a scraper for the fodder detached by the prongs from the fodder block lying on the prongs, so that the fodder can no longer reach the rotating shaft carrying the prongs and fodder fibers can no longer become twisted about this shaft.

The invention furthermore provides that the cover is U-shaped in cross section and that the side legs of the U of the cover protrude in the direction of the conveyor belt over the scraper prongs. The cover is thus open here towards the bottom, so that any fodder, which after all does pass through the slots, can fall from the open underside of the cover to the conveyor belt. In addition, such a cover is easily manufactured and can be installed and dismantled without difficulties, so that any repairs, which may be required, can be made quickly and easily.

In order to be also able to comminute and loosen larger fodder blocks thoroughly, a further development of the invention provides for several scraper shafts, which are parallel to one another and are aligned at right angles to the direction in which the conveyor belt is travelling.

Finally, provisions are made for this apparatus that the driving mechanism for the scraper shaft(s) is coupled with the driving mechanism of the conveyor belt. This design simplifies the driving mechanisms of the apparatus and, moreover, ensures that fodder, which reaches the conveyor belt from the scraper shaft or shafts, is discharged constantly. At the same time, any unnecessary operation of the conveyor belt, such as when the scraper shafts do not bring any fodder to the conveyor belt, is avoided.

A third design of the comminuting and discharging facility is characterized in that the comminuting and discharging facility comprises a conveyor belt, which runs at a distance from the open side of the container part at right angles to the apparatus, and of at least one double knife with two cutting edges, which is disposed between the conveyor belt and the container part. In the discharging position, the cutting edges lie in a vertical plane facing the underside of the fodder block. At least one of the two cutting edges can be oscillated in a horizontal direction parallel to the plane of the conveyor belt. In the case of this design, the double knives, with their cutting edges, see to it that, on the one hand, the fodder is loosened mechanically at the underside of the fodder block, which lies on the cutting edges, and, on the other, the fodder is comminuted effectively by the cutting up of the fodder fibers by means of the cutting edges. By these means, long-fibered fodder in particular is comminuted intensively and with that, prepared in an advantageous manner for feeding.

In order to be able to loosen intensively and comminute also larger fodder blocks with a relatively large base, several double knives are provided parallel to one another and at right angles to the direction of the conveyor belt in a further development of the second apparatus of the present invention. The distance between the double knives is advisably selected so as to ensure that fodder block parts, which have not been comminuted and loosened, cannot reach the conveyor belt between two adjacent double knives.

In a first, simpler development of the double knives, the latter can be constructed with a stationary and an oscillating cutting edge each. However, in order to attain a particularly intensive loosening and comminution of the fodder block, it is advantageous to construct each of the double knives with two cutting edges, which can oscillate in opposite directions. A back and forth movement of the block, which is ineffective for cutting and comminuting the fodder block, is thus reliably avoided.

With regard to the driving mechanism of the double knives, the invention provides that these double knives can be driven hydraulically by piston-cylinder units. Such piston-cylinder units are sturdy and operate reliably. Moreover, they are supplied relatively easily by an existing hydraulic installation on an agricultural vehicle.

Finally, the invention proposes an embodiment of the comminuting and discharging facility, which technically represents a combination of the two previously described embodiments and which is characterized in that two or more scraper shafts, as well as, between each of these, a double knife are disposed parallel to one another in the comminuting and discharging facility. The processing of the fodder, which is realizable with the scraper shaft and with the double knife, is thus combined in this apparatus and results in a particularly thorough loosening and comminution of the fodder. This last-mentioned apparatus is thus particularly suitable for processing and preparing fodders, which are especially difficult to handle and, on the one hand, have particularly long fibers and, on the other, are compacted unusually heavily.

The new apparatus is suitable particularly for use in smaller agricultural operations and offers relatively low procurement and maintenance costs and high profitability, because it can be used in so many different ways. Moreover, the apparatus can be constructed as a mounted implement for a tractor and also as a self-propelled or towed implement with its own chassis.

BRIEF DESCRIPTION OF THE DRAWINGS

An embodiment of the inventive apparatus is explained in the following by means of a drawing. The Figures of the drawing show the following:

FIG. 4 shows the apparatus in a third functioning position in side view.

FIG. 5 shows a scraper and cutter plate as part of the apparatus in plan view.

FIG. 6 shows the apparatus of FIG. 4, as viewed from the rear.

DESCRIPTION OF PREFERRED EMBODIMENTS

Figure 1:
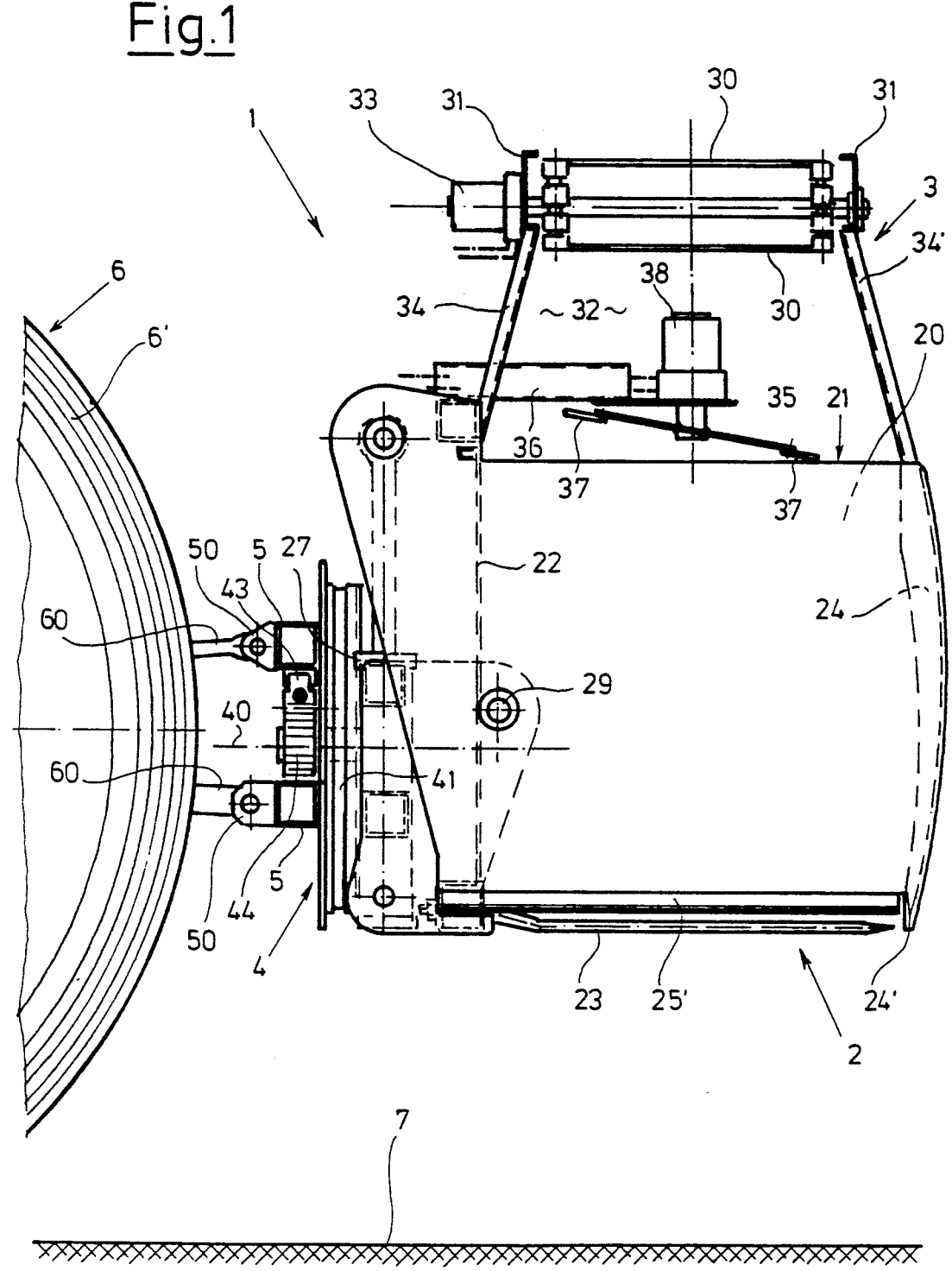
FIG. 1 shows an apparatus in a first embodiment in a first functioning position in side view.

In FIG. 1 of the drawing, a first embodiment of a transporting and discharging facility 1 for a fodder block is shown in a first functional position which is referred to in the following as the starting position. The apparatus 1 consists essentially of a box-shaped container part 2, a comminuting and discharging facility 3, which is mounted on the container part 2, and a tilting facility 4. The container part 2 comprises a rigid bearing rear wall 22, a front wall 24, two side walls 25, of which only the front side wall 25 is visible here, and a container bottom, which is constructed here as a grate with prongs 23. The two side wall 25 and 26 (the latter is not visible) and the front wall 24 are combined into a structural unit, which can be tilted about a horizontal tilting axle 29, which runs at right angles to the apparatus 1, that is, perpendicular to the plane of the drawing. To produce this tilting movement, two piston-cylinder units 27 and 27' are provided at the apparatus 1. They are disposed parallel to the rear wall 22. The front piston-cylinder units 27 is partially visible in FIG. 1.

The comminuting and discharging facility 3 is rigidly connected with the structural unit formed from the side walls 25 and 26 as well as the front wall 24. In the starting position of the apparatus 1 shown here, the facility 3 is above the container part 2 and in front of the open side 21 of this part 2. In the embodiment shown, the comminuting and discharging facility 3 comprises two cutting and scraping plates 35, of which only one is visible here. The scraping and cutting plate 35 is disposed above the open side 21 of the container part 2 and constructed as a swash plate, which can be rotated about a vertical axis of rotation by means of a drive motor 38. Radially, on the outside, the cutting and scraping plate carries several cutting knives 37 on the side facing the container part 2. The drive motor 38 for the scraping and cutting plate 35 is mounted on a bracket 36, which in turn is firmly connected with the rear wall 22 of the container 2. At a distance from the scraping and cutting plate 35, that is, in FIG. 1 above this plate 35, a conveyor belt 30 is provided, which runs at right angles to the apparatus 1, that is, perpendicularly to the plane of the drawing. At the side, the conveyor belt is held or mounted at a conveyor belt frame 31, which in turn is connected over two guide plates 34 and 34', which run at right angles to the apparatus 1, with the container part 2. A further drive motor 33 is provided to drive the conveyor belt. The rear, that is, in FIG. 1 the left guide plate 34 runs essentially in the extension of the rear wall 22, with which, however it is not connected. Instead, it is connected with the two side walls 25 and 26. The front guide plate 34', that is, the guide plate on the right of FIG. 1, runs in the extension of the front wall 24 of the container part 2 and is connected with this part 2.

The tilting facility 4, which is disposed on the back of apparatus 1, that is, on the left side in FIG. 1, comprises essentially a swivel bearing 41 with a horizontal swivelling axis 40, which runs in the longitudinal direction of the apparatus 1, that is, in the plane of the drawing of FIG. 1. Furthermore, the tilting facility 4 includes a toothed rack 43, which meshes with a gearwheel 44. The toothed rack 43 is mounted on a frame 5, which is disposed on the side of the swivel bearing 41 that is averted from the container 1 in such a way as to be displaceable in the axial direction at right angles to the apparatus 1, that is, perpendicularly to the plane of the drawing of FIG. 1. A piston-cylinder unit 42, which is not visible in FIG. 1, serves to shift the toothed rack 43. The gearwheel 44 is connected so that it cannot rotate with the part of the swivel bearing 41, which is averted from the frame 5 and can be rotated with respect to this. A tilting of the container part 2 together with the comminuting and discharging facility 3 about the swivelling axis 40 is thus brought about by shifting the toothed rack 43. The angle, through which these can be tilted, preferably is 180°.

Finally, connecting means 50 ar provided at the frame 5. In this case, they are stop brackets, which serve for the detachable connection of the apparatus 1 with the three-point linkage 60 of a tractor 6, of which only the rear wheel 6' is indicated here. Instead of a tractor 6, a different agricultural machine can also be used for mounting the apparatus 1. The apparatus 1 can also be mounted on the front loading arm of an agricultural vehicle.

In the starting position of the apparatus 1 shown in FIG. 1, a fodder block can be transported into the interior 20 of the container part 2. The grate with prongs 23 faces the foundation 7. It can be lowered by a lifting device of the tractor 6 to this foundation or raised to a sufficient height for transporting purposes. In this starting position of the apparatus 1, the comminuting and discharging facility 3 lies at the side of the apparatus 1 averted from the foundation 7.

Figure 2:
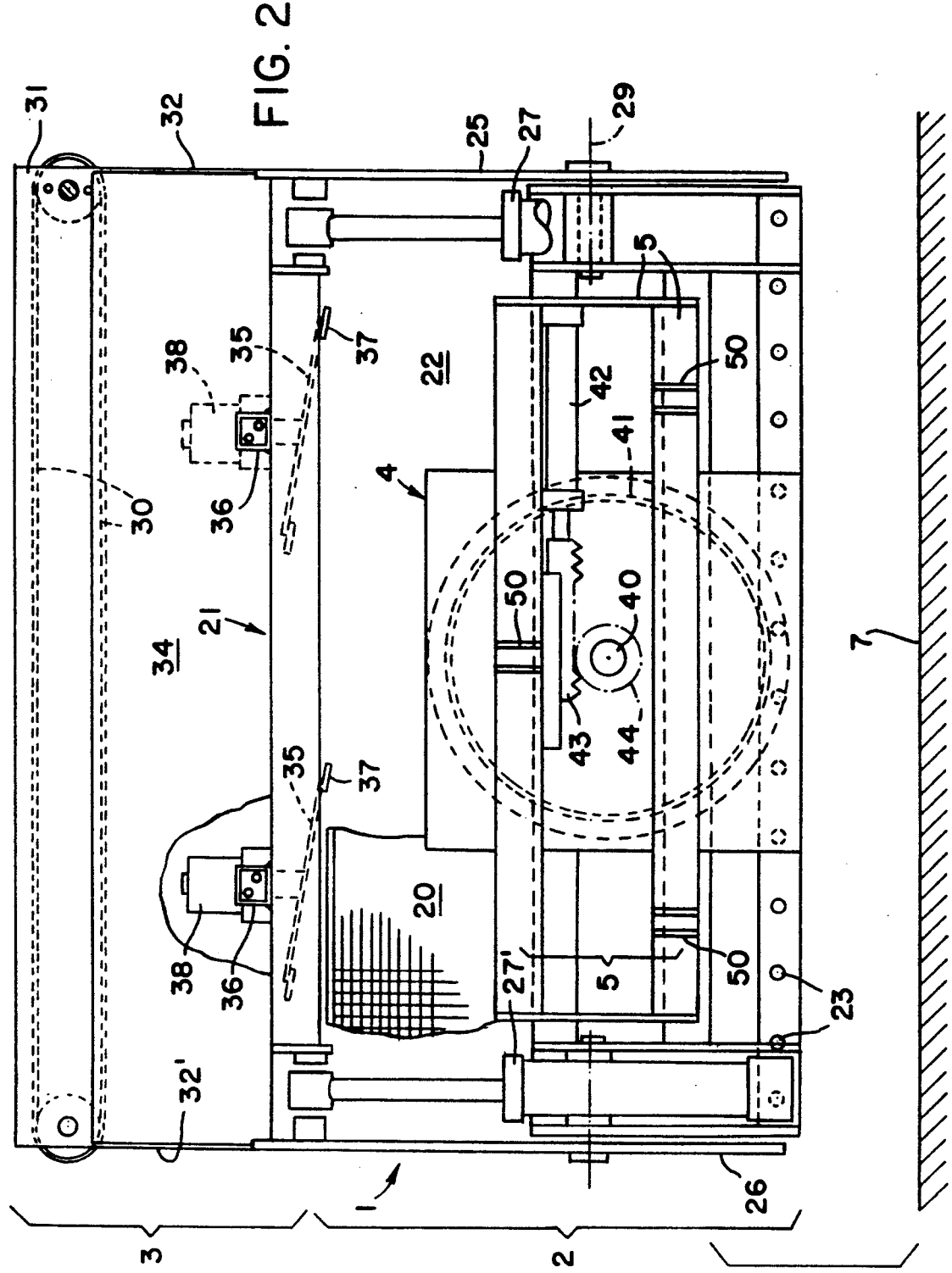
FIG. 2 shows an apparatus of FIG. 1, as viewed from the rear.

In FIG. 2, the apparatus 1 is shown in the same position as in FIG. 1, that is, also in the starting position. A view from the rear, that is a view of the left side of the apparatus 1 in FIG. 1 is shown here. The lower part of the apparatus 1 forms the container part 2, above which the comminuting and discharging facility 3 is disposed. The interior 20 of the container part 2 is bounded by the here visible side walls 25 and 26 at the sides, by the grate with prongs 23 at the bottom and by the rear wall 22 at the back, that is, at the side facing the viewer. The front wall 24 is not visible in this representation. In the side of the rear wall 22 facing the viewer, the bearing frame 5 with the connecting means 50 is disposed for mounting the apparatus 1 on a tractor, which is not visible here. Between this frame 5 and the rear wall 22 of the container part 2, the tilting facility 4 is placed, the swivelling axis 40 of which now runs perpendicularly to the plane of the drawing. Concentric with the swivelling axis 40 is the gearwheel 44, which meshes with the toothed rack 43, which can be moved horizontally at right angles to the apparatus 1, that is, in the plane of the drawing, by means of the piston-cylinder unit 42.

At the right and at the left outer edge of the rear wall 22, piston-cylinder units 27 and 27' are identifiable. Each of these is connected with its lower end to the rear wall 22 and with its upper end to the side walls 25 or 26. By operating these piston-cylinder units 27 and 27', the structural unit of apparatus 1, comprising the front wall 24 and the side walls 25 and 26 as well as the comminuting and discharging unit 3, can be tilted about the tilting axle 29, which also runs horizontally at right angles to the apparatus 1, that is, in the plane of the drawing.

In the region of the comminuting and discharging facility 3 lying above the container part 2, the view of the viewer falls on the left guide plate 34 in FIG. 1, behind which the two cutting and scraping plates 35 with their drive motor 38 and the associated bracket 36 can be identified. The two cutting and scraping plates 35 are positioned above the open side 21 of the container part 2. Discharge openings 32 and 32' are provided at the outermost right and left ends of the comminuting and discharging facility 3. Towards the top, the comminuting and discharging facility 3 is bounded by the conveyor belt 30 with its conveyor belt frame 31.

Figure 3:
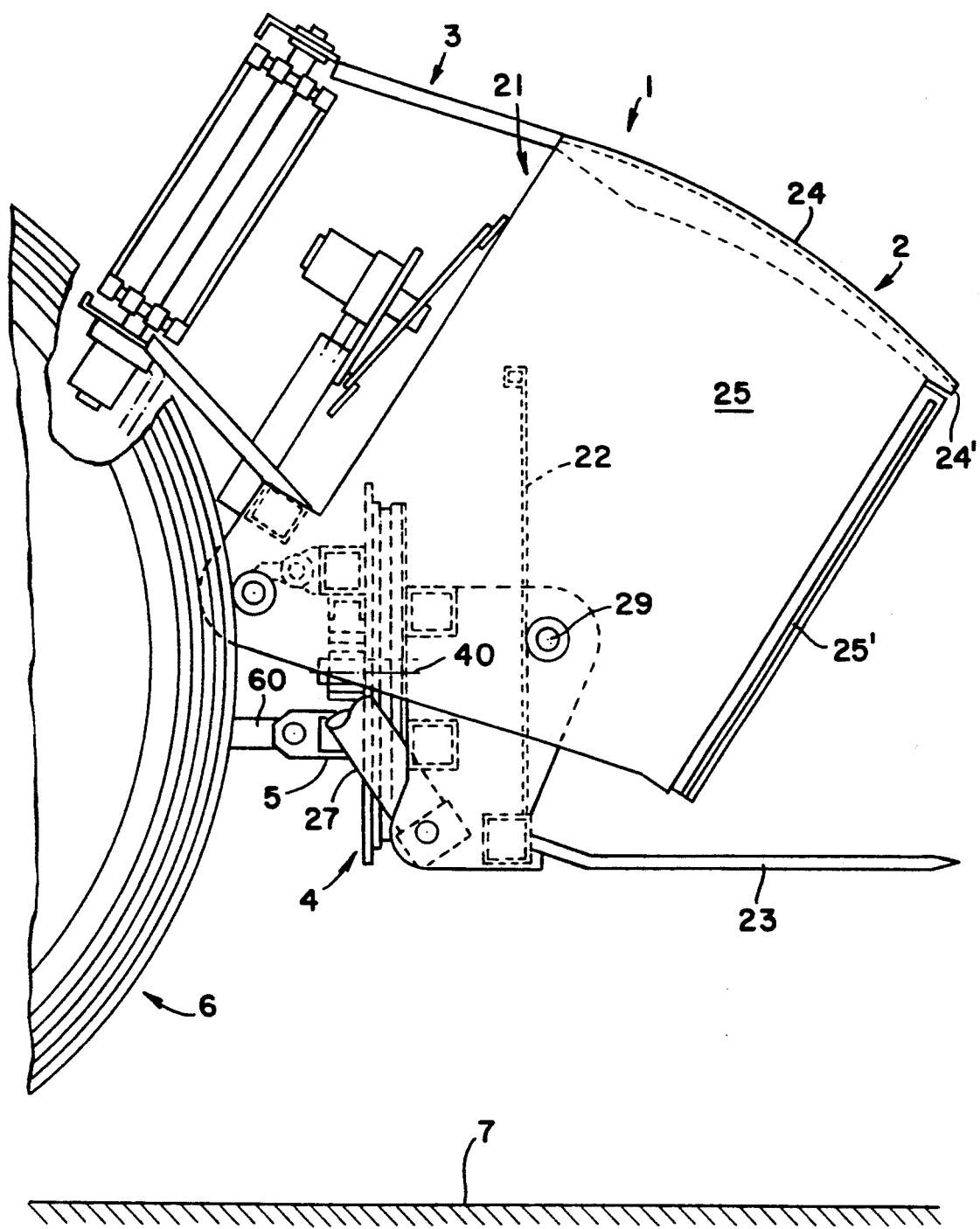
FIG. 3 shows the apparatus in a second functioning position in side view.

The foundation 7 is indicated below the apparatus 1, that is, below the grate with prongs 23. In FIG. 3, the apparatus 1 is shown in a second functioning position, which is referred to as the pickup position in the following. In this pickup position, the structural unit comprising the front wall 24 and the side walls 25 and 26 as well as the comminuting and discharging facility 3 is tilted counterclockwise about the tilting axle 29 by running in the piston-cylinder units 27, 27'. The front wall 24 as well as the side walls 25 and 26 are lifted upwards by this tilting, as a result of which the front side of the container part 2, that is, its right side in FIG. 3, is set free. In this pick-up position of the apparatus 1, the grate with prongs 23 can be inserted into a supply of fodder by moving it horizontally in the direction of the tips of the prongs. By subsequently tilting the tiltable structural unit back in the clockwise direction by running out or extending the piston-cylinder units 27, 27', a fodder block can now be cut out of the supply of fodder. To facilitate this cutting process, the front wall 24 and the side walls 25 and 26 are each constructed with cutting strips 24', 25' or 26' at their lower edges. After the tiltable structural unit is tilted back, there is thus a fodder block in the interior 20 of the container part 2, which is now closed again on all sides with the exception of the open upper side 21. The tilting facility 4 does not participate in this cutting process and maintains its position during this process. The height of the apparatus 1 and, with that, the height at which the fodder block is removed from the supply of fodder can be fixed by changing the height of the three-point linkage 60 of the tractor 6. The foundation 7 is visible below the apparatus 1, the apparatus 1 once again facing the foundation 7 with the grate with prong 23.

FIG. 4 of the drawing shows the apparatus 1 in a third functioning position, which is referred to in the following as the discharging position. This discharging position of the apparatus 1 is attained by tilting the tiltable part of the apparatus 1 about the horizontal swivelling axis 40 by means of the tilting facility 4. To bring about this tilting, the piston-cylinder unit 42 is actuated, that is, the toothed rack 43 connected herewith is shifted from its one end position axially into its other end position. By these means, the gearwheel 44 is turned through half a rotation, resulting in a tilting through 180°. At the same time, the apparatus 1 is lifted together with the fodder block in its container part 2 until no parts of the apparatus 1 can come into contact with the foundation 7 during the tilting. The height required for the apparatus 1 can once again be set by the height adjustment of the three-point linkage 60 of the tractor 6.

In the discharging position of the apparatus 1, in which its tiltable part is turned "on its head", the container part 2 forms the upper part and the comminuting and discharging facility 3 the lower part of the apparatus 1. The comminuting and discharging facility 3 now lies below the open side 21 of the container part 2, from the interior 20 of which the fodder block therein is now supplied under the action of gravity to the comminuting and discharging facility 3. By means of the cutting and scraping plate 35, which can now be caused to rotate by its drive motors 38, fodder is gradually cut away by means of the cutting knife 37 from the downwards pointing side of the fodder block, which is not shown in the Figures. This fodder, which has been cut away, then drops under the action of gravity onto the conveyor belt 30. The conveyor belt 30 is set in motion by its drive motor 33. Depending on the direction in which the motor 33 is running, the one or the other running direction of the conveyor belt 30 and, with that, the one or the other discharging direction of the apparatus I can be selected The fodder, removed from the fodder block by means of the cutting and scraping plate 35, is directed by the two guide plates 34 and 34, to the upper side of the narrower conveyor belt 30, so that fodder losses are largely excluded.

In this discharging position of the apparatus 1, the comminuting and discharging facility 3 thus faces the foundation 7 and, in this discharging position, the fodder can be discharged directly either to the one or to the other side into fodder troughs as the tractor 6 is moving slowly. To protect the operators against injuries, the discharging openings 32 and 32' at the comminuting and discharging facility 3 can be covered with elastic, flexible covers, which are not shown here, against intrusion from the outside.

FIG. 5 shows one of the cutting and scraping plates 35 as part of the comminuting and discharging facility 3 in plan view. As shown by FIG. 5, the cutting and scraping plate 35 can be rotated about its central axis and carries, radially, on the outside and distributed over its periphery, several, in this case a total of four cutting knives 37, which are provided on both sides with cutting edges. By turning the cutting knives 37, the second cutting edges of these knives can be brought into use, so that a longer tool life results, before the cutting knives 37 have to be resharpened or exchanged. In addition, the cutting and scraping plate shown here is provided at its upper side, that is, at its side facing the fodder block, with a scraper strip 37', which is bent in the shape of an S and runs through the center of the plate 35. In each case, the convex curvature of the scraper strip 37 runs forwards in the direction of rotation, so that the fodder, falling on the upper side of the plate 35, is transported radially towards the outside. In addition, the cutting and scraping plate 35 is disposed canted on its axis of rotation, that is, constructed as a swash plate. Therefore, as the cutting and scraping plate 35 rotates, there is an effective loosening and comminuting movement, which ensures a uniform loosening and removal of the fodder from the fodder block.

FIG. 6 of the drawing finally shows the apparatus 1 in the same position as that in FIG. 4, but now viewed from the rear. The description of FIG. 2 is referred to for the explanation of the individual parts of apparatus 1. However, the positions, top and bottom or left and right must be interchanged, because the apparatus 1, as a whole, has been swivelled about the swiveling axis 40 through 180° in the plane of the drawing of FIG. 6. Correspondingly, the toothed rack 43, which meshes with the gearwheel 44, is drawn in its second end position.

Figure 7:
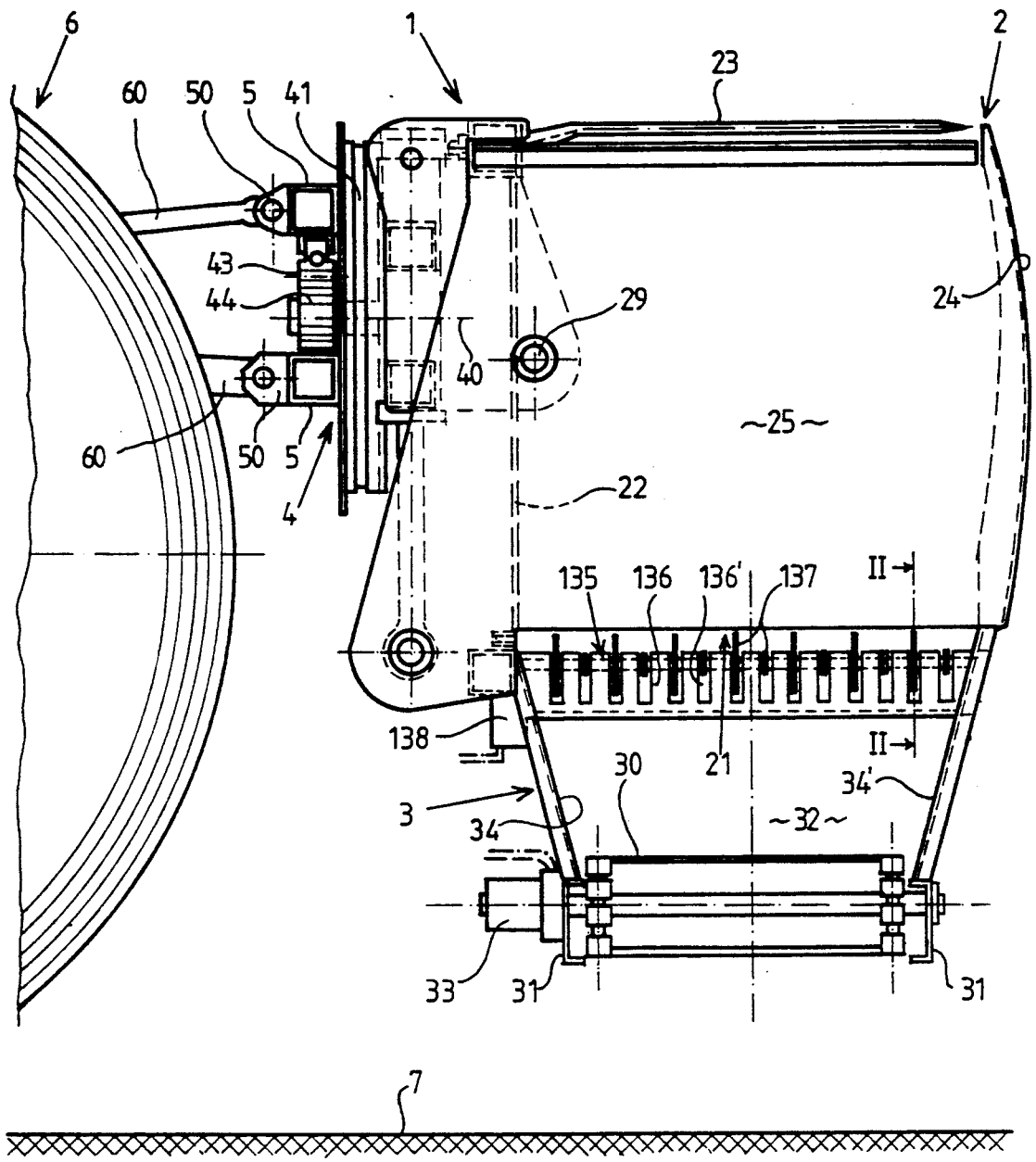
FIG. 7 shows the apparatus in a second embodiment, in its discharging position in side view.

In FIG. 7 of the drawing, a second embodiment of the transporting and discharging apparatus 1 for a fodder block is shown in a functioning position referred to as discharging position in the following. Here also, the apparatus 1 consists essentially of the box-shaped container part 2, the comminuting and discharging facility 3 mounted on the container part 2 and the swiveling facility 4. The container part 2 once again comprises the rigid, bearing rear wall 22, the front wall 24, the two side walls, of which the front side wall 25 is visible here, and the container bottom, which is also constructed as a grate with prongs 23 here. The two side wall and the front wall 24 are combined into the structural unit, which can be tilted about a horizontal tilting axle 29, which runs at right angles to the apparatus 1, that is, perpendicularly to the plane of the drawing. For producing this tilting motion, two piston-cylinder units, which are disposed hidden and parallel to the rear wall 22, are also provided at the apparatus 1 of FIG. 7.

The comminuting and discharging facility 3 is rigidly connected with the structural unit formed from the side walls 25 and the front wall 24. In the discharging position of apparatus 1 shown here, the comminuting and discharging facility 3 lies below the container part 2 and in front of the open side 21 of the latter. The comminuting and discharging facility 3 comprises in the embodiment shown here several scraper shafts 135, of which one is visible here. The scraper shaft 135 is disposed under the open side 21 of the container part 2 and is constructed as a rotatable shaft with scraper prongs 137, which can be rotated about a horizontal axis of rotation by means of a drive motor 138. The scraper shaft 135 is mounted rotatably on bearings at its ends and connected in this manner with the remaining part of the apparatus 1. On the upper side, as well as to the side of the scraper shaft 135, a cover 136 is mounted, which consists of a bent sheet of metal, which is U-shaped in cross section and has a number of parallel slots 136', which permit passage of the scraper prongs 137. The side parts of the cover 136 are pulled so far downwards, that the cover forms there a continuous sheet metal strip and protrudes over the scraper prongs 137 downwards, that is, in the direction of the conveyor belt 30. As is clearly evident from FIG. 7, the scraper prongs 137 protrude upwards through the slots 136' out of the cover 136, while in the downwards direction they are hidden by the cover. The cover 136 has the function of a scraper for fodder fibers, which are pulled by the scraper shaft 135 fodder block lying on it. As a result, these fodder fibers cannot twist around the scraper shaft 135 and, irrespective of their length, are guided reliably to the conveyor belt 30. The drive motor 138 for the scraper shaft 135 is disposed at one end of the scraper shaft 135.

At a distance from the scraper shaft 135, that is, in FIG. 7 below this shaft 135, a conveyor belt 30 is provided, the conveying direction of which runs at right angles to the apparatus 1, that is, perpendicularly to the plane of the drawing. At the side, the conveyor belt 30 is held or mounted on a conveyor belt frame 31, which, in turn, is connected over two guide plates 34 and 34', which run at right angles to the apparatus 1, with the container part 2. A further drive motor 33 is provided to drive the conveyor belt. The rear, that is, the left guide plate 34 in FIG. 7 runs essentially in the extension of the rear wall 22, with which, however it is not connected. Instead, it is connected with the two side walls 25. The front guide plate 34', that is, the guide plate on the right of FIG. 1, runs in the extension of the front wall 24 of the container part 2 and is connected with this.

The tilting facility 4, which is disposed on the back side, that is, on the left side of the apparatus 1 in FIG. 7, comprises essentially a swivel bearing 41 with a horizontal swivelling axis 40, which runs in the longitudinal direction of the apparatus 1, that is, in the plane of the drawing of FIG. 7. Furthermore, the tilting facility 4 includes a toothed rack 43, which meshes with a gearwheel 44. The toothed rack 43 is mounted on a frame 5 on the side of the swivel bearing 41 averted from the container in such a way as to be displaceable in the axial direction at right angles to the apparatus 1, that is, perpendicularly to the plane of the drawing of FIG. 7. A piston-cylinder unit, which is not visible in FIG. 7, serves to shift the toothed rack 43.

The gearwheel 44 is connected so that it cannot rotate with the part of the swivel bearing 41, which is averted from the frame 5 and can be rotated with respect to this. A tilting of the container part 2 together with the comminuting and discharging facility 3 about the swivelling axis 40 is thus brought about by shifting the toothed rack 43. The angle, through which these can be tilted, preferably also is 180° here.

Finally, connecting means 50 are provided at the frame 5. In the present case, they are stop brackets, which serve for the detachable connection of the apparatus 1 with the three-point linkage 60 of a tractor 6, of which only the rear wheel 6' is indicated here. Instead of a tractor 6, a different agricultural machine can also be used for mounting the apparatus 1. The apparatus 1 can also be mounted on the front loading arm of an agricultural vehicle.

In the discharging position shown of the apparatus 1, in which its tiltable part is turned "on its head", the container part 2 forms the upper part and the comminuting and discharging facility 3 the lower part of the apparatus 1. The comminuting and discharging facility 3 lies below the open side 21 of the container part 2, from the interior 20 of which the fodder block therein is now supplied under the action of gravity to the comminuting and discharging facility 3. By means of the scraper shafts 135, which are now caused to rotate by their drive motors 138, fodder is gradually removed from the downwards pointing side of the fodder block, which is not shown in the Figures. This fodder, which has been removed, then falls under the action of gravity onto the conveyor belt 30. The conveyor belt 30 is set in motion by its drive motor 33. Depending on the direction in which the motor 33 is running, the one or the other running direction of the conveyor belt 30 and, with that, the one or the other discharging direction of the apparatus 1 can be selected. The fodder, removed from the fodder block by means of the scraper shafts 135, is directed by the two guide plates 34 and 34' to the upper side of the narrower conveyor belt 30, so that fodder losses are largely excluded. In this discharging position of the apparatus 1, the comminuting and discharging facility 3 thus faces the foundation 7 and the fodder can be discharged directly either to the one or to the other side into fodder troughs as the tractor 6 is moving slowly.

Figure 8:
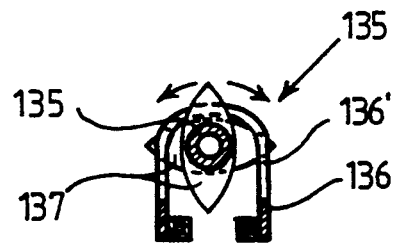
FIG. 8 shows a cut-out of the apparatus of FIG. 7 in section along the line VIII—VIII in FIG. 7.

The pointed elliptical shape of the scraper prongs 137 and the U shape of the cover 136 become particularly clear from the cross section, which is shown in FIG. 8 and corresponds to the line VIII—VIII in FIG. 7. Moreover, one of the slots 136' in the cover 136, through which the scraper prong 137, the front scraper prong here, passes, is visible in FIG. 8. A second scraper prong 137, which is disposed on the scraper shaft 137 so as to be offset by 90°, is visible in the background. The scraper shaft 135 can be operated either in the one or in the other direction of rotation, as is indicated by the two arrows above the scraper shaft 135. Because of the pointed elliptical outline of the scraper prongs 137, fodder is reliably detached from the underside of the fodder block but, even if longer fodder fibers are present, fodder cannot be pulled into the slots 136' of the cover 136, because an obtuse angle is always formed between the cover 136 and the outline of the scraper prongs 137.

Figure 9:
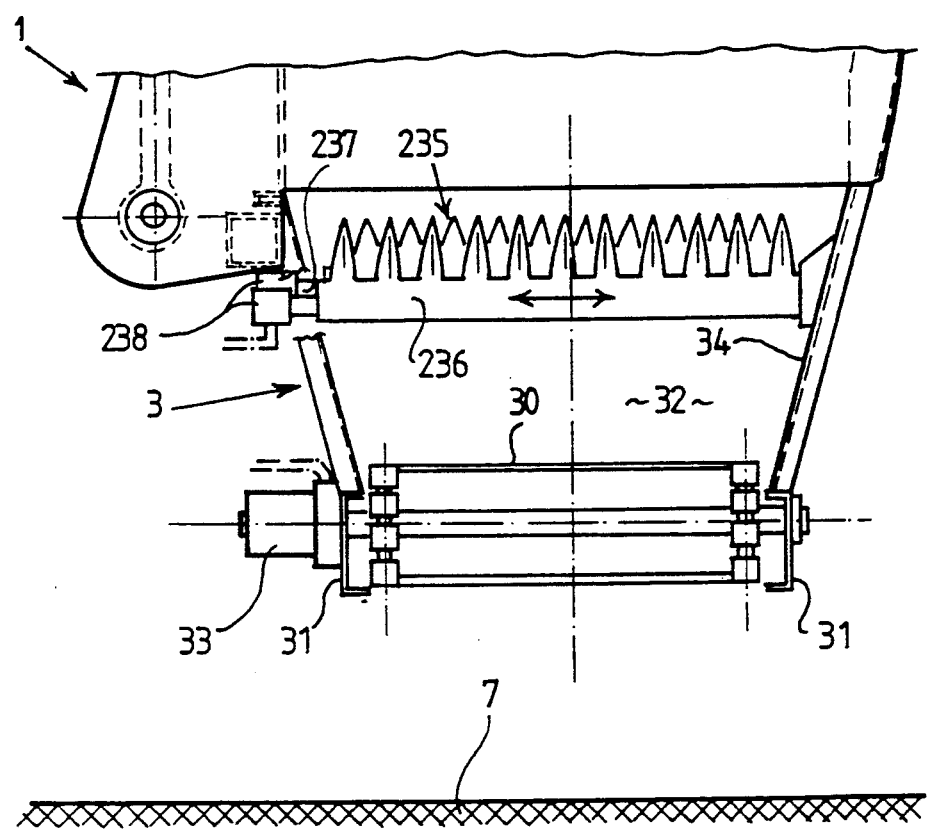
FIG. 9 shows the apparatus in a cut-out representation in a third embodiment, also in side view.

FIG. 9 of the drawing finally shows a third embodiment of the apparatus 1, of which only a section with its comminuting and discharging facility 3 is shown here. The lower part of the comminuting and discharging facility 3 once again forms a conveyor belt 30 here, the parts of which were described previously in conjunction with FIGS. 1 and 7.

Contrary to the previously described embodiment, a number of double knives 235 are disposed here above the conveyor belt 30 parallel to one another and at right angles to the conveying direction of the conveyor belt 30. One of the double knives 235 is visible here. Each of the double knives 235 comprises two cutting edges 236 and 237, which can move in opposite directions and are provided with adjacent, cooperating cutting teeth. The cutting edges 236 and 237 are disposed in a vertical plane and, in the discharging position shown here, point upwards with their cutting teeth, that is, in the direction of the underside of a fodder block that lies on them. The two cutting edges 236 and 237 of the double knife 235 can be caused to oscillate in opposite directions by means of piston-cylinder units 238, as indicated by the movement arrow at the front cutting edge 236. One of the cutting edges 236, 237 can also be stationary. Due to the cutting motion, on the one hand, the fodder block lying on the cutting teeth is loosened from the direction of its underside and, on the other, the fibers of the fodder, particularly if long fibers are present, are effectively cut and thus advantageously shortened for the feeding. The loosened and cut fibers of the fodder then fall, as described before, under the action of gravity onto the conveyor belt 30 underneath and can be discharged by this on the one or the other side of the apparatus 1 and dumped, for example, into fodder troughs.

Aside from the way shown here, in which the embodiments are equipped either with scraper shafts 135 or with double knives 235, the apparatus 1 one can also be equipped with scraper shafts 135 and double knives 235. In this case, alternately a scraper shaft 135 and a double knife 235 are advisably provided on the apparatus 1 in pairs, next to one another and at right angles to the conveying direction of the conveyor belt 30.

While there have been described what ar at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An apparatus for transporting an discharging a fodder block, the apparatus comprising a container having an open side for holding the fodder block and a comminuting and discharging facility, which is connected with the container,
   in a starting position of the apparatus serving for the transport of the fodder block, means for disposing the container with the open side pointing upwards and for disposing the comminuting and discharging facility above this open side of the container and
   said disposing means comprising means for tilting the container together with the comminuting and discharging facility through an angle of approximately 180° about an essentially horizontal swivelling axis into a discharging position, in which the open side of the container points downwards and in which the comminuting ad discharging facility is below this open side and in which the fodder block in the container is supplied by the action of gravity to the comminuting and discharging facility from above.

2. The apparatus of claim 1, in which the container has cutting means for cutting out a fodder block form a supply of fodder.

3. The apparatus of claim 1, in which the container has a front wall and two flat side walls, and which includes means for tilting the front wall and the side walls, together with the comminuting and discharging facility, downwards as a structural unit about a horizontal tilting axle, which runs at right angles to the apparatus, said means for tilting the front walls and the side walls downwards comprising means for tilting the front side of the container part upwards after the fodder block has been picked up.

4. The apparatus of claim 3, which includes cutting strips disposed at the lower edges of the front wall and of the side walls, an underside of the container being constructed as a grate with prongs and in which said means for tilting the front wall and the side walls downwards includes a mechanical drive for tilting the structural unit for cutting the fodder block out of the fodder supply downwards.

5. The apparatus of claim 1, which includes connecting mean for mounting the apparatus on coupling facilities existing on an agricultural vehicle.

6. The apparatus of claim 1, in which the apparatus includes and is disposed on its own chassis.

7. The apparatus of claim 1, in which the swivelling axis runs in a longitudinal direction of the apparatus.

8. The apparatus of claim 1, in which the container includes a fixed, bearing rear wall, and in which said tilting means has a part that is averted from the rear wall, the tilting means being disposed at the rear wall and which apparatus includes connecting means, for mounting the apparatus on a vehicle and disposed on the part of the tilting means that is averted from the rear wall.

9. The apparatus of claim 8, in which said tilting means includes a swivel bearing with a remote-controlled tilting driving mechanism for causing the tilting about the swivelling axis.

10. The apparatus of claim 9, which includes at least one piston-cylinder unit and a gear wheel and in which the tilting driving mechanism comprises a toothed rack, which can be shifted axially by the at least one piston-cylinder unit and the gearwheel, which meshes with this to the rack and is connected with the tiltable comminuting and discharging facility so that it cannot rotate.

11. The apparatus of claim 1, in which the comminuting and discharging facility comprises a conveyor belt, which runs at a distance from an open side of the container in a direction at right angles to the apparatus, and which includes at least one cutting and scraping plate, which is disposed between the conveyor belt and the container and is rotatable about an essentially vertical axis 12. The apparatus of claim 11, in which the cutting and scraping plate is a swash plate with cutting knives and scraper, which are disposed radially on the outside.

13. The apparatus of claim 1, in which the comminuting and discharging facility comprises a conveyor belt, which runs at a distance form the open side of the container part at right angles to the apparatus, and which includes at least one scraper shaft, which is disposed between the container and the conveyor belt and is rotatable about an axis that is essentially horizontal in the discharging position.

14. The apparatus of claim 13, in which the scraper shaft comprises a cylindrical or hollow cylindrical shaft and a scraper prongs, which are rigidly connected with this shaft and protrude radially from it.

15. The apparatus of claim 14, in which the scraper prongs are flat, pointed, elliptical pieces of sheet metal and are disposed in planes perpendicular to the axis of rotation of the scraper shaft and symmetrical to this axis.

16. The apparatus of claim 15, which includes a cover for the scraper shaft and with slots permitting the passage of the scraper prongs.

17. The apparatus of claim 16, in which the cover is U-shaped in ross section and that the side legs of the U of the cover protrude in the direction of the conveyor belt above the scraper prongs.

18. The apparatus of claim 17, which includes several scraper shafts which are aligned parallel to one another and at right angles to a running direction of the conveyor belt.

19. The apparatus of claim 18, which includes a driving mechanism of the scraper shafts and a driving mechanisms of the conveyor belt, said driving mechanisms being coupled together.

20. The apparatus of claim 1, in which the comminuting and discharging facility comprises a conveyor belt running at a distance from the open side of the container at right angles to the apparatus and at least one double knife with two cutting edges disposed between the container part and the conveyor belt, the cutting edges in a discharging position of the apparatus lying in a vertical plane facing an underside of the fodder block, and means for moving at least one of the two cutting edges in an oscillating manner in horizontal direction parallel to a plane of the conveyor belt.

21. The apparatus of claim 20, in which several double knives are provided parallel to one another and aligned at right angles to running direction of the conveyor belt.

22. The apparatus of claim 21, in which the double knives have two cutting edges for oscillating in opposite directions.

23. The apparatus of claim 22, which includes piston-cylinder units and in which the double knives are driven hydraulically by the piston-cylinder units.

24. The apparatus of claim 23, which includes two or more scraper shafts as well as, between each of these, a double knife disposed parallel to one another in the comminuting and discharging facility.

* * * * *